United States Patent
Artman

(10) Patent No.: US 6,583,351 B1
(45) Date of Patent: Jun. 24, 2003

(54) SUPERCONDUCTING CABLE-IN-CONDUIT LOW RESISTANCE SPLICE

(75) Inventor: Thomas A. Artman, Forest, VA (US)

(73) Assignee: BWX Technologies, Inc., Lynchburg, VA (US)

( * ) Notice: Subject to any disclaimer, the term of this patent is extended or adjusted under 35 U.S.C. 154(b) by 0 days.

(21) Appl. No.: 10/045,813

(22) Filed: Jan. 11, 2002

(51) Int. Cl.[7] .................................................. H01B 7/34
(52) U.S. Cl. ..................................................... 174/15.5
(58) Field of Search .............................. 174/15.5, 15.6, 174/15.7, 88 R, 94 R, 125.1; 29/599, 869

(56) References Cited

U.S. PATENT DOCUMENTS

| | | | | |
|---|---|---|---|---|
| 3,317,658 A | * | 5/1967 | Smith ..................... | 174/138 F |
| 5,004,865 A | * | 4/1991 | Krupnicki ................. | 174/15.6 |
| 5,600,095 A | | 2/1997 | Dew et al. | |

* cited by examiner

Primary Examiner—Chau N. Nguyen
(74) Attorney, Agent, or Firm—Robert C. Baraona

(57) ABSTRACT

A low resistance splice connects two cable-in-conduit superconductors to each other. Dividing collars for arranging sub-cable units from each conduit are provided, along with clamping collars for mating each sub-cable wire assembly to form mated assemblies. The mated assemblies ideally can be accomplished by way of splicing collar. The mated assemblies are cooled by way of a flow of coolant, preferably helium. A method for implementing such a splicing is also described.

25 Claims, 6 Drawing Sheets

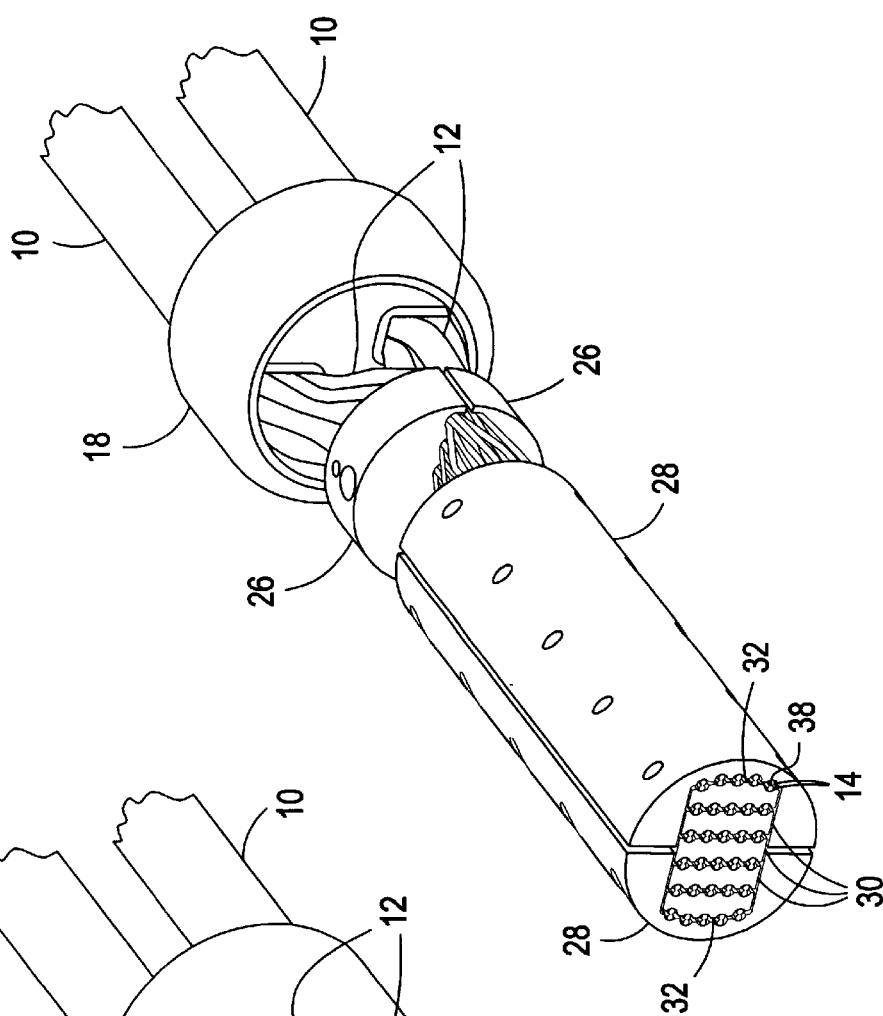
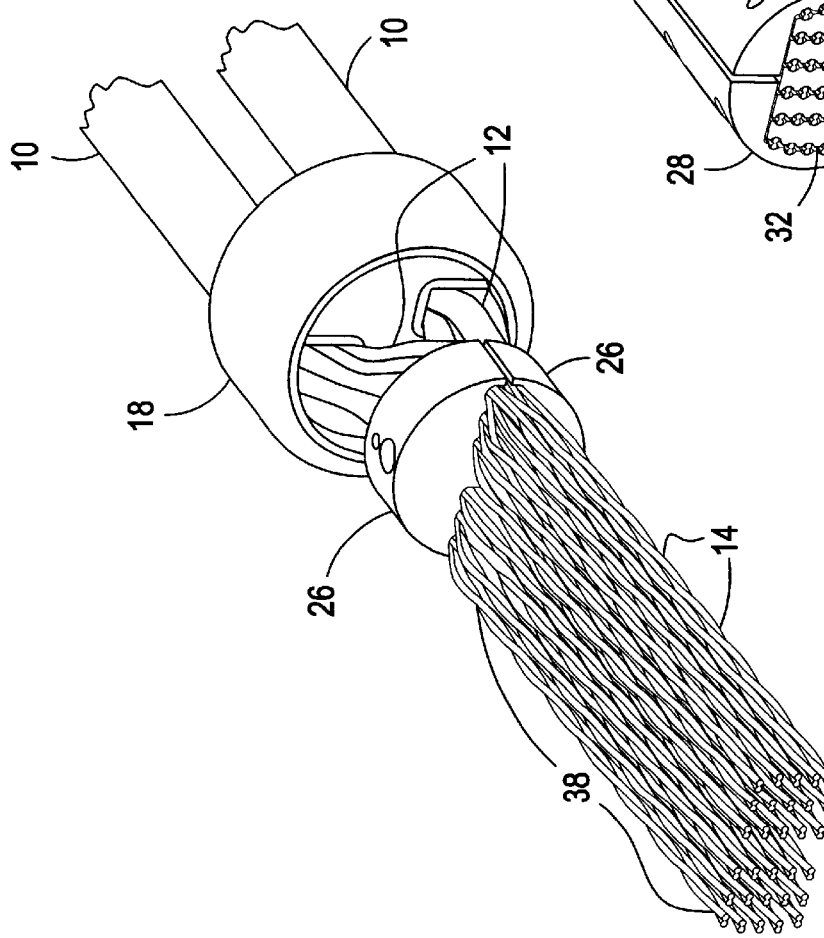

SUPERCONDUCTING CABLE-IN-CONDUIT LOW RESISTANCE SPLICE

The subject matter of the present invention was developed under a research contract with the U.S. Department of Energy (DOE), Contract No. DE-FC36-94G01001. The governments of the U.S. and Virginia have certain rights in the invention.

FIELD AND BACKGROUND OF THE INVENTION

The present invention relates generally to the field of splices for electrical conductors and, more specifically, to a splice configuration particularly useful with superconducting cable-in-conduit conductors of the sort used in superconducting magnetic energy storage systems.

Superconducting magnetic energy storage (SMES) systems are capable of storing large amounts of electrical energy in a DC magnetic field for indefinite periods. Power from a utility grid or other power source such as a wind turbine or solar plant can be stored until needed, then returned to the utility grid or any specific application at any time. Utility applications include load leveling, spinning reserve, transmission system stability and reliability and voltage/power factor correction.

A SMES system often utilizes a cable-in-conduit conductor, which includes a superconducting alloy, wound into a large diameter solenoidal coil. The conductor is cooled to a temperature which will allow for superconductivity of the coil. With present commercial superconducting materials, the coil must be cooled with supercritical or liquid helium to a temperature approaching −456° F. (1.8° K.).

Typical SMES coils frequently are very large in diameter, often having diameters of over 10 feet. Because of the length of the coils, it is necessary to splice lengths of cable to form the continuous coil. These splices must have electrical and physical properties that do not degrade the performance of the coil.

With the regular conductive materials (i.e., copper or aluminum) used at ambient temperatures, two cables are mechanically fastened or soldered together. Typical of the prior art techniques for joining two conductors together are the crimp rings disclosed by Bennett in U.S. Pat. No. 3,231,964, and soldering as described by McIntosh et al. in U.S. Pat. No. 3,517,150.

Superconductors are materials, often metals or ceramics, that lose all resistance when cooled below a critical temperature. Many materials have superconducting capabilities, although most materials will only superconduct at temperatures approaching 0° K. At present, the most practical of these materials are superconductive magnets that are cooled to a temperature at or near the boiling point of helium (4.20 K.). Given these extreme conditions, cables connected to such superconducting magnets must be connected via special splices that are not normally encountered under "regular" conditions (as mentioned above).

Instead, NbTi alloys and the compound $Nb_3Sn$ are used in this regard. The most common method of splicing these alloys has been the lap splice, where the cable ends are overlapped and soldered together. Such soldered lap splices exhibit relatively high resistance which leads to excessive local heating and ultimately raises the spliced superconductors above the critical superconducting temperature, thereby causing a loss of superconductivity. The loss of superconducting properties can also occur due to the frictional heating caused by motion of a poorly supported current-carrying superconductor in the presence of a magnetic field, which results in a force on-the superconductor. In either case, the reduction or loss of superconductivity is one of the biggest problems encountered in SMES systems.

A number of highly specialized methods have been developed in order to connect ends of superconductor cables without interposing a high resistance material, such as solder, there-between. For example, U.S. Pat. No 4,794,688 proposes to overlap the strands of each cable and then crimp the strands together. However, this approach is not effective with many superconductor cables, and it only provides a mechanical joint that may have insufficient strength for some applications.

Alternatively, multi-filament cable ends have been joined by intertwining the superconductor filaments, heating to a diffusion temperature then crimping a sleeve over the connection as described by Smathers in U.S. Pat. No. 5,111,574 and Jones in U.S. Pat. No. 4,631,808. However, this complex process would be too difficult to consistently accomplish for a multi-stranded cable-in-conduit superconducting cable because of the number of times the process would need to be repeated to form a useful SMES device.

A cable-in-conduit conductor splice has also been developed. Specifically, a spliced sub-cable region is filled with solder, as described by Dew et al. in U.S. Pat. No. 5,600,095. Such solder filled sub-cable splices are prone to excessive local heating because the superconductor sub-cable surface is deprived of direct contact with coolant, such as liquid helium. Thus, these splices are inadequate for SMES applications.

Given the above, a continuing need exists for a simple but effective method of splicing many cable-in-conduit superconducting cables together to form a longer cable suitable for large magnet coils or other applications without increasing electrical resistance, decreasing coolant surface area, or otherwise degrading the electrical and physical properties of the coil.

SUMMARY OF THE INVENTION

It is an object of the present invention to provide a low resistance method and apparatus for splicing two separate cable-in-conduit superconductors to each other. Each cable-in-conduit superconductor has a plurality of sub-cable units, and each sub-cable unit has a plurality of sub-cable wire assemblies (each wire assembly can be multiple, stranded superconducting elements, such as niobium-titanium wires encapsulated by copper). The aforementioned splicing method and apparatus mates the sub-cable units, and the sub-cable wires thereof, to one another in manner that also allows for ease of construction and in-situ cooling of the surfaces involved. The overall combination will provide enhanced performance of the spliced connection relative to the previously known methods/apparatus described above. Moreover, it is expected that the present invention will have particular utility in the field of SMES systems.

Accordingly, a splicing apparatus comprises first and second superconducting cable-in-conduit units. Both superconducting cable-in-conduit units have a plurality of sub-cable units wherein the sub-cable unit comprises a plurality of sub-cable wires. Means for arranging the individual sub-cable units of the first superconducting cable-in-conduit unit to be in close proximity to the individual sub-cable units of the second superconducting cable-in-conduit unit is provided. The individual sub-cable wires of each unit are enclosed by means for mating every sub-cable wire from the first unit to that of the second unit in a fashion that allows for an electrical connection. The means for mating is fluidically connected to a means for cooling the sub-cable wires contained therein. Optionally, means for properly positioning each sub-cable unit proximate to the means for dividing may be included. The entire assembly may be contained in a housing which includes a coolant port.

A method for splicing superconductors is also described. First, a pair of superconducting cables is provided, wherein each superconducting cable comprises a plurality of sub-cable units and wherein each sub-cable unit comprises a plurality of sub-cable wires. A sealed housing unit is also provided. The sub-cable units are arranged so that the sub-cable units of the first superconducting cable are placed in close proximity to the sub-cable units of the second superconducting cable. Next, the sub-cable wires of each respective sub-cable unit are electrically joined and placed within the housing. Lastly, the joined wires are then cooled.

The aforementioned apparatus and method find particular applicability in the field of superconductive electrical connection devices. In particular, this invention is expected to improve performance of the superconductor in which the invention is incorporated or practiced.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

BRIEF DESCRIPTION OF THE DRAWINGS

In the drawings:

FIG. 7 is a schematic perspective view of a splice joining the superconductor strands;

FIG. 8 is a schematic perspective view of a splice clamping the superconductor strands.

DESCRIPTION OF THE PREFERRED EMBODIMENTS

Figure 1:
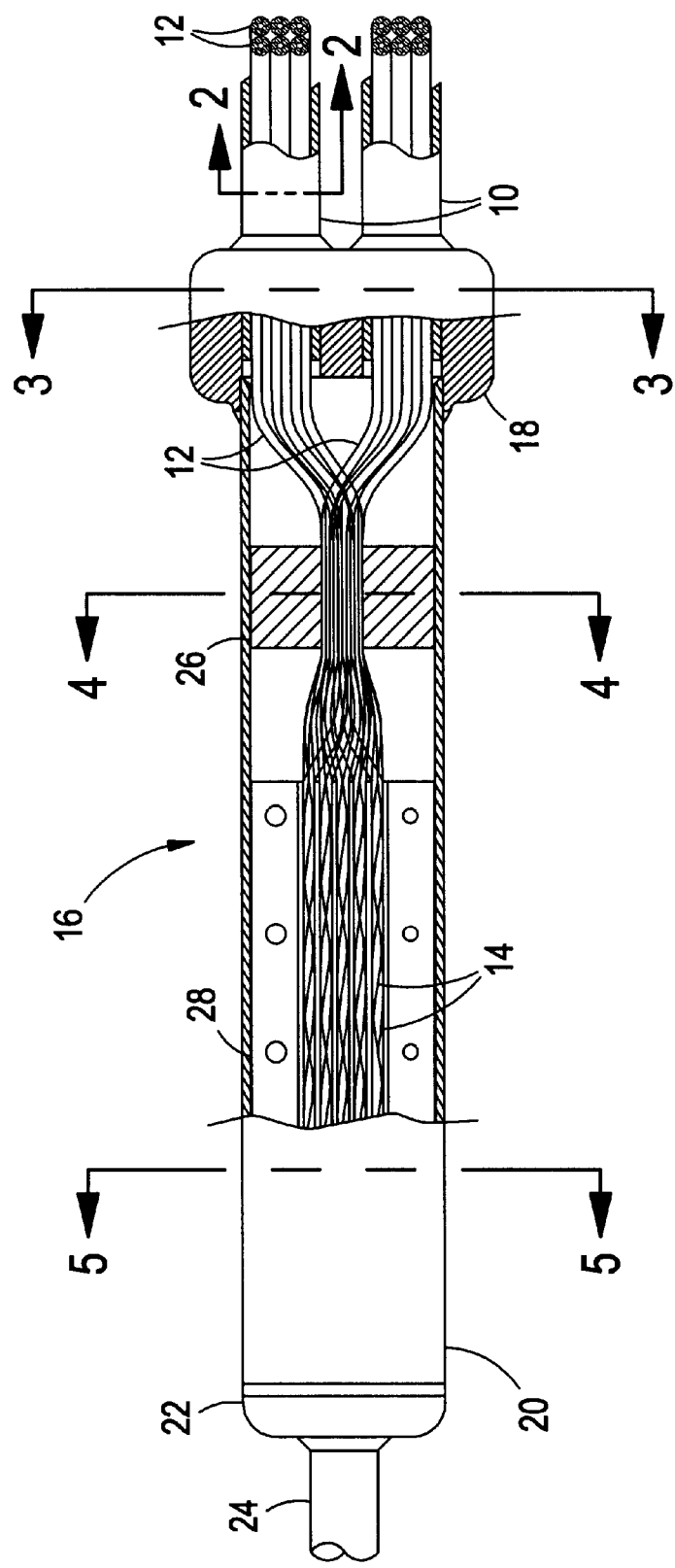
FIG. 1 is a plan view, partly cutaway, of a splice joining two cable-in-conduit superconducting cables of the type particularly adapted to the splice of the present invention.
Figure 3:
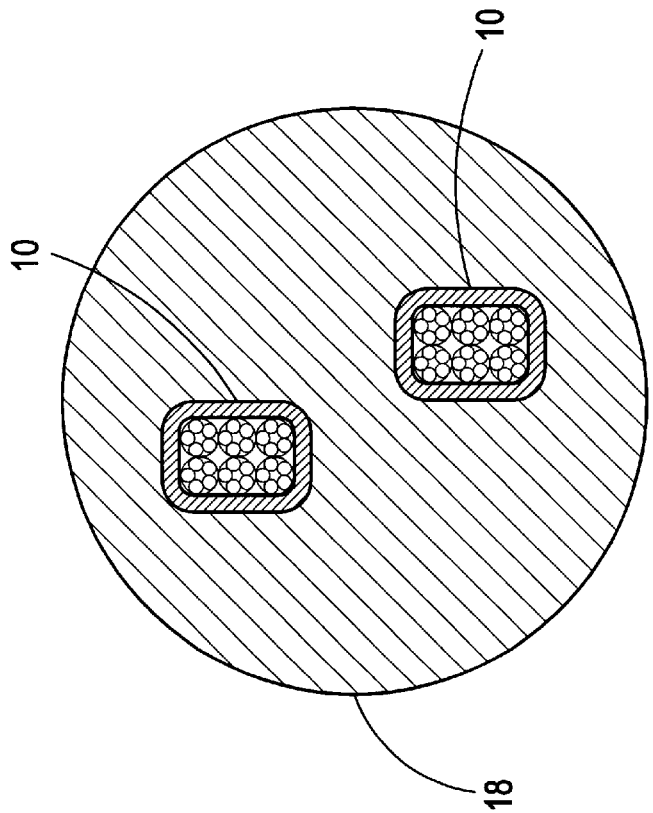
FIG. 3 is a sectional view taken on line 3—3 of FIG. 1.
Figure 2:
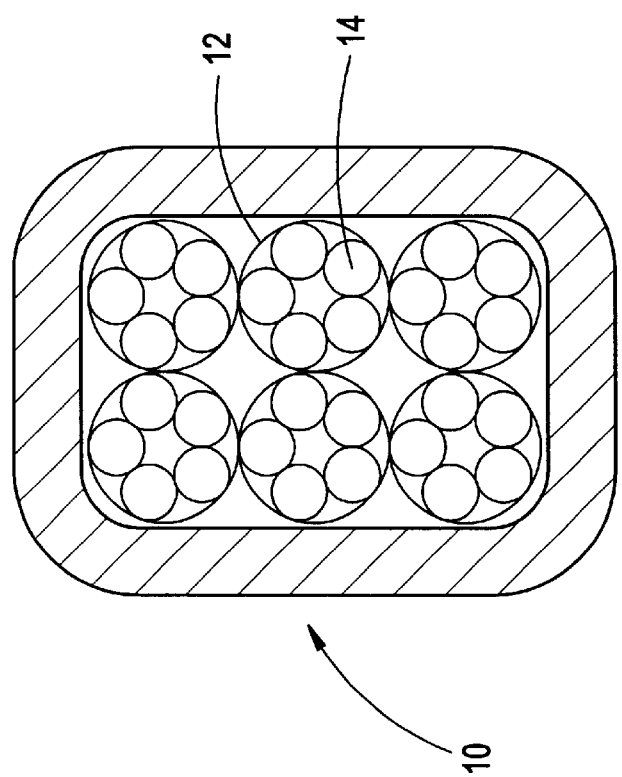
FIG. 2 is a sectional view taken on line 2—2 of FIG. 1.

Referring now to the drawings, in which like reference numerals are used to refer to the same or similar elements, FIGS. 1 to 8 illustrate a splice according to the present invention which will be explained in greater detail later in this disclosure.

Figure 9:
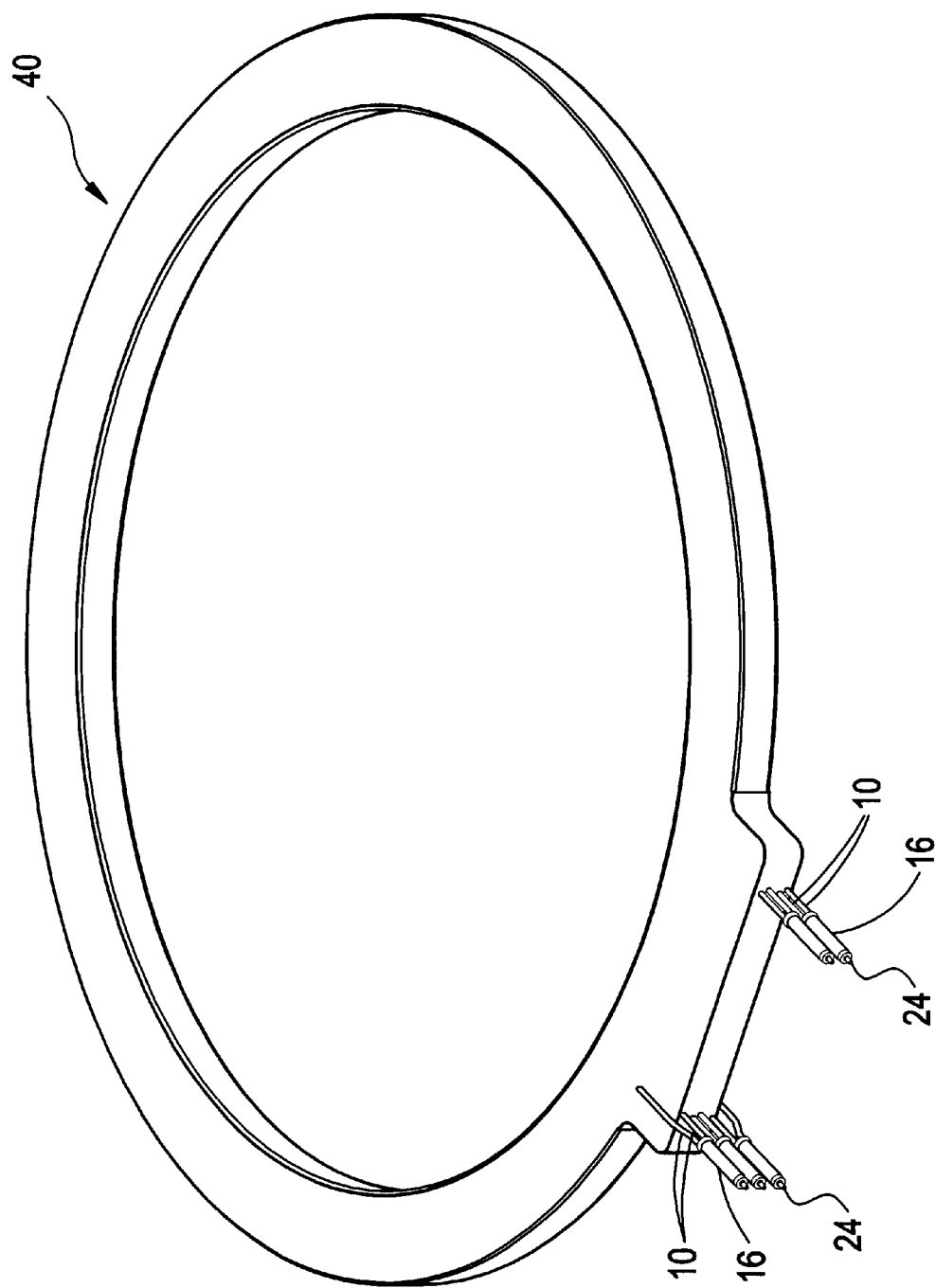
FIG. 9 is a schematic perspective view of a large magnet coil used in the splice of the present invention.

As seen in FIG. 9, a large superconducting magnet coil 40, such as that used in superconducting magnet energy storage systems, includes a number of helical coils, stacked in a circular pattern. Because of limitations on the manufacture and transport of long lengths of a cable-in-conduit superconductor cable 10, periodic splices 16 are necessary. In the embodiment shown, five splices 16 are provided in each coil ring. In operation, liquid helium or other suitable coolant, depending on the superconductor used, is circulated through the splice by means of the cable-in-conduit 10 and the coolant entry port 24. Furthermore, the Lorentz forces created by the magnet coil must be resisted by the splice joint to maintain the superconductor below its critical temperature.

Two cable-in-conduit superconductors 10, which will be joined in a low resistance splice are shown in the partly cutaway, plan view in FIG. 1. Basically, cable-in-conduit superconductor 10 depicted in FIG. 2 includes a plurality of sub-cable units 12 surrounded by a rectangular conduit, preferably constructed of a metal or other suitable material. The sub-cable units 12 are ideally encapsulated in a metal rectangular conduit that provides mechanical restraint as well as confinement for flowing coolant around the compacted sub-cable bundle. Also, although six sub-cable units 12 are depicted, those skilled in the art will readily adapt the principles of this invention to suit particularized needs.

The six sub-cable units 12 consist of five sub-cable wire assemblies 14 (again the precise number being easily adapted to suit a particular need). Each sub-cable wire assembly 14 consists of multiple stranded superconducting wires (typically a Niobium-Titanium superconductor surrounded by copper, not shown here for clarity).

Figure 4:
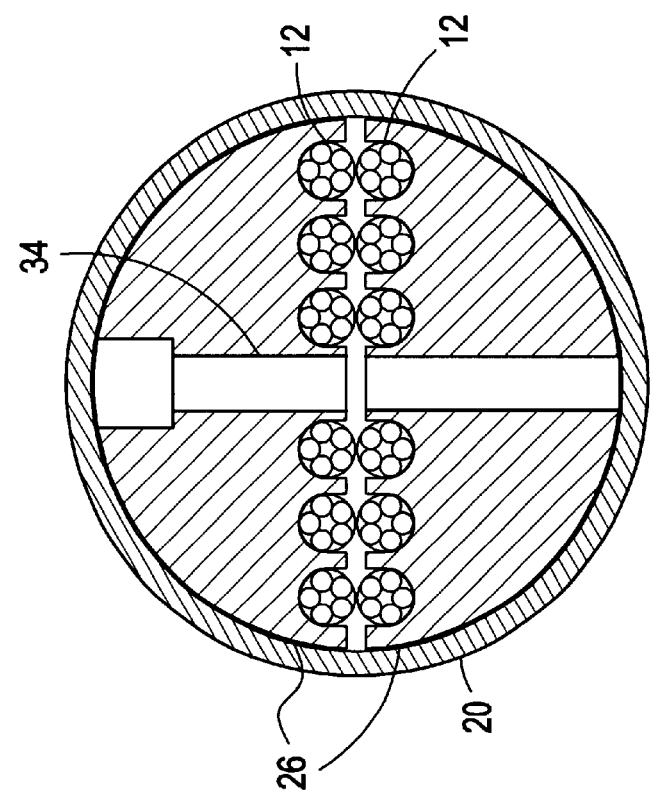
FIG. 4 is a sectional view taken on line 4—4 of FIG. 1.

A splice joint 16 is shown in plan view, partly cut away, in FIG. 1, with FIGS. 2–5 showing sectional views taken along the corresponding lines in FIG. 1. In each case, two parallel cable-in-conduit conductors 10 are connected in a sealed fashion (preferably via a welded connection) to an enclosure fitting 18. As seen in FIGS. 1 and 4, the enclosure fitting 18 initially holds each conduit in place for further repositioning within splice joint 16, and it further helps to offset the two mating conduits 10 in terms of weld access and cable cooling.

The rectangular conduit cover is removed once each conduit enters the inside of the enclosure fitting 18 so as to expose the encapsulated sub-cable units 12 of each conduit 10. The sub-cable units 12 are separated from the rectangular bundle and arranged in a repeatable manner so as to facilitate further connections between the sub parts.

In particular, each sub-cable arrangement 12 is rigidly maintained by placing each mating sub-cable in a means for arranging the sub-cable wire assemblies of each unit 12. Preferably, this means for arranging comprises a dividing collar. The dividing collar has adjacent channels embedded in two divider clamp pieces 26. Two divider bolts 34, or other fasteners, may be used to hold together the entire dividing collar. Each divider clamp 26 receives six sub-cables from each of the conduits 10. The channels in the divider clamp 26 preferably have depths less than the diameter of sub-cables 12, to permit clamping with divider bolts 34 as seen in FIG. 4, and the channels are ideally constructed from an electrically non-conductive material. Additionally or alternatively, the divider clamps 26 are of a non-conductive material, thus reducing AC losses and enhancing the splice performance.

The six mating sub-cables are further sub-divided into sixty sub-cable wire assemblies 14 using any known means for mating the corresponding elements, thereby forming a single, mated assembly. In a preferred embodiment, the mated pairs can be intertwined or twisted together under tension to form 30 4pairs of electrically conductive splices as shown in FIG. 7. The twist pitch of each mating pair of sub-cable wire assembly can be between five and fifteen times, and more ideally about ten times, the diameter of one entire sub-cable wire assembly so as to permit wire to wire contact of each mating strand of the sub-cable wire assembly in order to optimize performance. The active joint length of the mated assembly can be between five and fifteen times, and most preferably ten times, the twist pitch in order to optimize performance.

Figure 5:
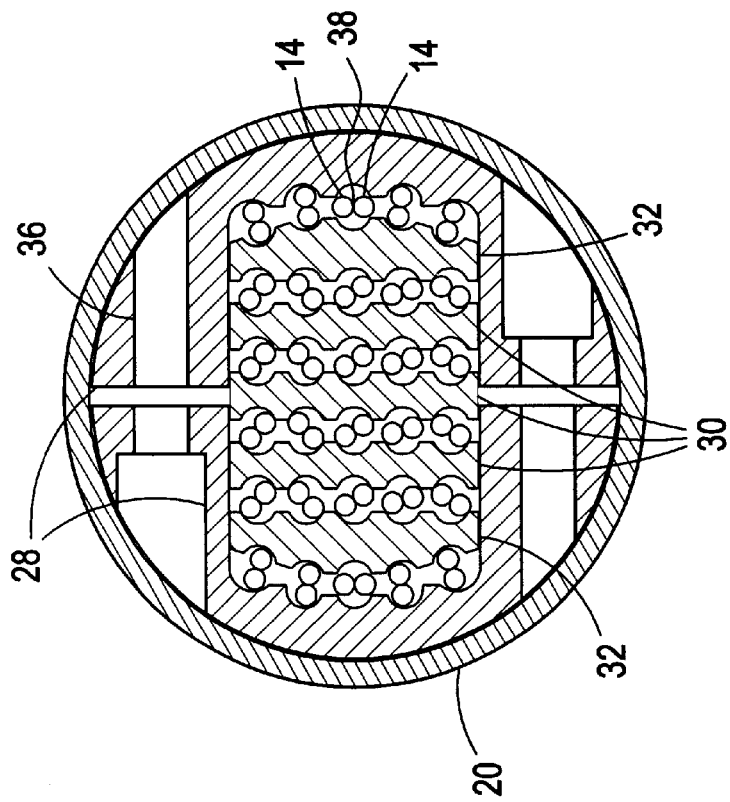
FIG. 5 is a sectional view taken on line 5—5 of FIG. 1.
Figure 6:
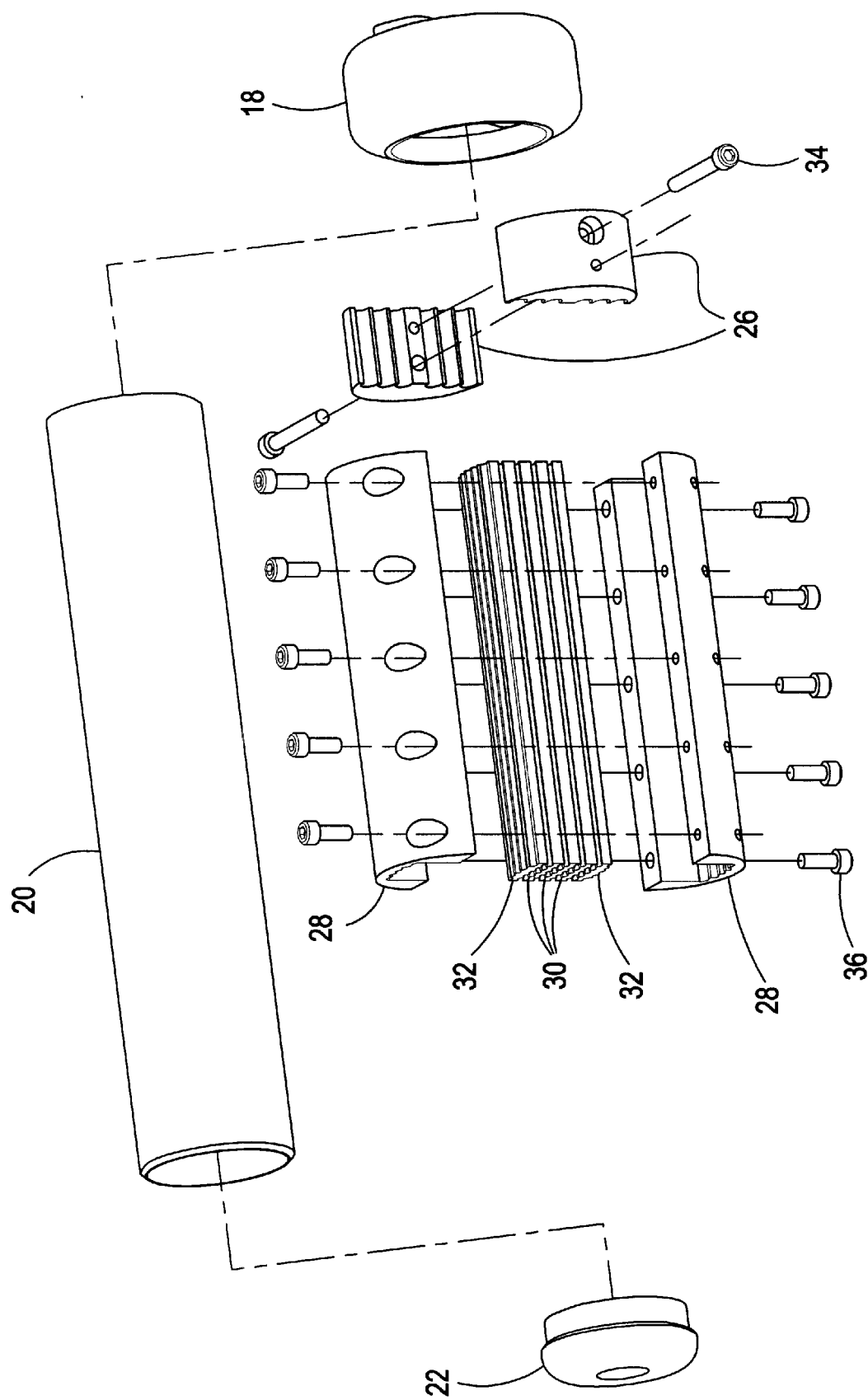
FIG. 6 is an exploded view of the splice members of the present invention.

The electrical connection between each element of sub-cable wire assembly 14 can be fused by any known means. Ideally, means for mating the sub-cable wire assemblies 14 include solder 38 (or other electrically conductive joining media) placed on a portion of the mated assembly, as seen in FIGS. 5 and 7, and a splicing collar assembly. The splicing collar includes corresponding splice channels for each mated assembly embedded in two splice channel clamps 28, in three middle channel members 30, and in two end channel members 32. Notably, the number (and/or need) for middle channel members 30 and end channel members 32 can be adjusted upward or downward as needed. This splice channel assembly is clamped together by inserting and tightening the splice bolts 36, or other fastening devices, as illustrated in FIG. 6. The splice collar assembly comprising clamps 28 and members 30 and 32 is configured to receive the five by six array of thirty mated pairs of sub-cable wire assemblies 14, as seen in FIGS. 5 and 8. Splices channels in the members also have depths less than the effective diameter of the mated assembly formed from the two separate sub-cable wire assemblies 14 so as to maintain the cables in place and add mechanical strength to the splice. The splice channels are ideally constructed from a non-conductive material thus reducing AC losses and increasing the splice performance. Additionally, the splice channels allow ingress and egress of coolant to come in direct contact with the sub-cable wire assemblies' surfaces. This feature eliminates excessive local heating of the splice by allowing a large surface area on each mated pair, which in turn permits good heat transfer and removal (via coolant flow).

A metal enclosure tube or member 20 can be fitted around the splice arrangement and sealed to the metal enclosure fitting 18 such as by welding. In addition, a metal enclosure cap 22 can be sealed to the metal enclosure tube 20. A helium port 24 is connected to the enclosure cap 22 through which a coolant, such as liquid helium, can be admitted to the splice and cables.

A method of splicing is also contemplated by the present invention. Similar to the apparatus described above, the method requires providing at least two separate cable-in-conduit superconductor units. Each unit is made up of a series of sub-cable units, and the individual sub-cable units have sub-cable wire assemblies made of superconducting elements. The sub-cable units of each cable-in-conduit superconductor unit are arranged in close proximity. Individual sub-cable wire assemblies from each sub-cable unit are then intertwined so as to form an intertwined assembly. Each intertwined assembly is then surrounded with an electrically conductive media. Finally, a coolant is provided to each intertwined assembly in order to maintain superconductivity in the superconductor units.

As above, niobium-titanium superconductor elements, clad in copper, may be incorporated into each sub-cable wire assembly during the method. Ideally, the coolant provided is a liquid helium. A solder connection is preferred. Both a divider collar device and/or a splice collar device, as described above, may be provided and used to achieve the arranging and surrounding steps. Finally, the exact lengths and twist pitches employed may be determined according to the principles discussed above.

The main advantages of the aforementioned invention are simplicity of construction, low splice resistance, good mechanical support, and effective, continuous cooling as needed to maintain superconductivity. Moreover, known construction, assembly and soldering techniques can be used to produce repeatable results.

Tight twisting under tension and solder impregnation of individual mated assemblies can be employed to ensure a low over-all splice joint resistance. Nevertheless, any method of contacting the elements that produces a large effective area and close contact of the individual elements comprising the joint are acceptable.

The channel plate configuration employed for this joint provides mechanical stability for each splice, by securely restraining each of the thirty individual sub-sub-cable splices that comprise the entire splice joint.

This arrangement prevents loss of superconductivity within the resulting splice. Further, it avoids frictional heating (and resulting temperature rise) caused by possible motion of the splice in the magnetic field of the coil.

The helium flow paths around the twisted sub-cable wire assemblies of each individual splice joint provide effective cooling of the splice by providing increased surface cooling area over previous designs to carry away any heat generated in the splice. The non-conductive channel plates eliminate any additional possible heat generation in the splice area, due to ramping the magnetic field of the coil.

Initial tests of the splice according to the present invention demonstrated several positive results. Foremost, a surprisingly low resistance of $1\times10^{-9}$ ohms (⅕th of max design allowable) was noted. Also, the splice transient stability was excellent, with no trip even after many successive ramps from 0.9 T to 1.8 T and a ramp of 0.66 T/sec. Lastly, the splice quenched at 6.8 K., 2.4 T and 4.0 kA—all well above operating requirements.

The cable-in-conduit superconducting cable configuration may change with more or fewer sub-cables to splice. The current splice invention can be altered to accommodate other cable configurations by adding or subtracting the number of channels required for each cable configuration.

The present invention consist of two cable-in-conduit conductors coming together parallel and from the same orientation. However, the cable-in-conduit cables can be perpendicular to one another or parallel and opposing each other. More than two cables can be spliced in the same manner presented here.

If space constraints require a more compact design, a shorter active splice length may be possible without degrading the current splice performance. Depending on the magnets' transient design, a change in the active splice length may not alter the transport current distribution and CICC stability.

While a specific embodiment of the invention has been shown and described in detail to illustrate the application of the principles of the invention, it will be understood that the invention may be embodied otherwise without departing from such principles.

I claim:

1. A low resistance superconductor splice comprising:
   a first cable-in-conduit superconductor unit having a plurality of sub-cable units wherein each sub-cable unit contains a plurality of sub-cable wire assemblies and wherein each sub-cable wire assembly includes at least one superconducting element;
   a second cable-in-conduit superconductor unit having a plurality of sub-cable units wherein each sub-cable unit contains a plurality of sub-cable wire assemblies and wherein each sub-cable wire assembly includes at least one superconducting element;

means for arranging each sub-cable unit of the first cable-in-conduit superconductor unit to be in close proximity to each sub-cable unit of the second cable-in-conduit superconductor unit;

means for mating individual sub-cable wire assemblies of each sub-cable unit of the first cable-in-conduit superconductor unit in an electrically conductive fashion to individual sub-cable wire assemblies of each sub-cable unit of the second cable-in-conduit superconductor unit in order to form a plurality of mated sub-cable wire assemblies;

means for cooling each mated sub-cable wire assembly to maintain superconductivity in the first and second cable-in-conduit superconductor units, the means for cooling being fluidically connected to the means for mating;

a sealed enclosure surrounding the means for arranging, the means for mating, and the means for cooling and a welded conduit holder for initially positioning the first and second cable-in-conduit units; and wherein the means for arranging is positioned in between the conduit holder and the means for mating.

2. A splice as set forth in claim 1, wherein the first and second cable-in-conduit superconductor units are enclosed by a metallic casing which is capable of containing a flow of coolant therethrough.

3. A low resistance superconductor splice comprising:

a first cable-in-conduit superconductor unit having a plurality of sub-cable units wherein each sub-cable unit contains a plurality of sub-cable wire assemblies and wherein each sub-cable wire assembly includes at least one superconducting element;

a second cable-in-conduit superconductor unit having a plurality of sub-cable units wherein each sub-cable unit contains a plurality of sub-cable wire assemblies and wherein each sub-cable wire assembly includes at least one superconducting element;

a divider collar for arranging each sub-cable unit of the first cable-in-conduit superconductor unit to be in close proximity to each sub-cable unit of the second cable-in-conduit superconductor unit wherein the divider collar includes two pieces held together by at least one fastening device;

means for mating individual sub-cable wire assemblies of each sub-cable unit of the first cable-in-conduit superconductor unit in an electrically conductive fashion to individual sub-cable wire assemblies of each sub-cable unit of the second cable-in-conduit superconductor unit in order to form a plurality of mated sub-cable wire assemblies; and means for cooling each mated sub-cable wire assembly to maintain superconductivity in the first and second cable-in-conduit superconductor units, the means for cooling being fluidically connected to the means for mating.

4. A low resistance superconductor splice comprising:

a first cable-in-conduit superconductor unit having a plurality of sub-cable units wherein each sub-cable unit contains a plurality of sub-cable wire assemblies and wherein each sub-cable wire assembly includes at least one superconducting element;

a second cable-in-conduit superconductor unit having a plurality of sub-cable units wherein each sub-cable unit contains a plurality of sub-cable wire assemblies and wherein each sub-cable wire assembly includes at least one superconducting element;

a divider collar for arranging each sub-cable unit of the first cable-in-conduit superconductor unit to be in close proximity to each sub-cable unit of the second cable-in-conduit superconductor unit;

a clamping collar, at least one positioning member interposed within the clamping collar, and an electrically conductive joining media for mating individual sub-cable wire assemblies of each sub-cable unit of the first cable-in-conduit superconductor unit in an electrically conductive fashion to individual sub-cable wire assemblies of each sub-cable unit of the second cable-in-conduit superconductor unit in order to form a plurality of mated sub-cable wire assemblies; and means for cooling each mated sub-cable wire assembly to maintain superconductivity in the first and second cable-in-conduit superconductor units, the means for cooling being fluidically connected to the means for mating.

5. A splice as set forth in claim 4, wherein the clamping collar includes two pieces held together by at least one fastening device.

6. A splice as set forth in claim 4, wherein the electrically conductive joining media comprises a sub-cable wire assembly from the first cable-in-conduit superconductor unit intertwined around a corresponding sub-cable wire assembly from the second cable-in-conduit superconductor unit to form an intertwined assembly and wherein at least a portion of the intertwined assembly is encapsulated by solder.

7. A splice as set forth in claim 6, further comprising a sealed housing which encloses at least the divider collar, the clamping collar, a terminal end of the first cable-in-conduit superconductor unit and a terminal end of the second cable-in-conduit superconductor unit and wherein the means for cooling comprises a flow of helium provided to an entry port on the sealed housing.

8. A splice as set forth in claim 7, wherein each sub-cable wire assembly includes niobium-titanium superconductor element surrounded by copper.

9. A splice as set forth in claim 6, wherein the intertwined assembly is formed under tension and wherein the intertwined assembly has a twist pitch based upon a diameter of the sub-cable wire assembly of the first cable-in-conduit superconductor unit.

10. A splice as set forth in claim 9, wherein the twist pitch is between 5 and 15 times the diameter of the sub-cable wire assembly of the first cable-in-conduit superconductor unit.

11. A splice as set forth in claim 9, wherein the soldered portion of the intertwined assembly has a length equal to between 5 and 15 times of the twist pitch.

12. A splice as set forth in claim 4, wherein the clamping collar has a plurality of splicing channels associated with each sub-cable wire assembly; wherein each positioning member has a corresponding plurality of splicing channels associated with each sub-cable wire assembly relative to the splicing channels of the clamping collar; and wherein the splicing channels of the clamping collar and the positioning member are formed from an electrically non-conductive material.

13. A splice as set forth in claim 12, wherein each sub-cable wire assembly of the first cable-in-conduit superconductor unit has a defined diameter and wherein each splice channel has a depth which is less than the diameter of the sub-cable wire assembly of the first cable-in-conduit superconductor unit.

14. A low resistance superconductor splice comprising:
a first cable-in-conduit superconductor unit having a plurality of sub-cable units wherein each sub-cable unit contains a plurality of sub-cable wire assemblies and wherein each sub-cable unit of the first cable-in-conduit superconductor unit has a defined diameter and wherein each sub-cable wire assembly includes at least one superconducting element;
a second cable-in-conduit superconductor unit having a plurality of sub-cable units wherein each sub-cable unit contains a plurality of sub-cable wire assemblies and wherein each sub-cable wire assembly includes at least one superconducting element;
a divider collar for arranging each sub-cable unit of the first cable-in-conduit superconductor unit to be in close proximity to each sub-cable unit of the second cable-in-conduit superconductor unit wherein the divider collar includes a plurality of dividing channels associated with each sub-cable unit and wherein the dividing channels are formed from an electrically non-conductive material and wherein each dividing channel has a depth which is less than the diameter of the sub-cable unit of the first cable-in-conduit superconductor unit;
means for mating individual sub-cable wire assemblies of each sub-cable unit of the first cable-in-conduit superconductor unit in an electrically conductive fashion to individual sub-cable wire assemblies of each sub-cable unit of the second cable-in-conduit superconductor unit in order to form a plurality of mated sub-cable wire assemblies; and
means for cooling each mated sub-cable wire assembly to maintain superconductivity in the first and second cable-in-conduit superconductor units, the means for cooling being fluidically connected to the means for mating.

15. A method for splicing a first cable-in-conduit superconductor unit to a second cable-in-conduit superconductor unit comprising:
providing first and second cable-in-conduit superconductor units, each unit having a plurality of sub-cable units wherein each sub-cable unit contains a plurality of sub-cable wire assemblies;
providing a divider collar having individual, electrically non-conductive divider channels for each sub-cable unit from the first cable-in-conduit superconductor unit; placing each sub-cable unit of the first cable-in-conduit superconductor unit in a divider channel along with a corresponding sub-cable unit of the second cable-in-conduit superconductor unit; and securely fastening the divider collar;
intertwining an individual sub-cable wire assemblies from the sub-cable unit of the first cable-in-conduit superconductor unit with a corresponding one of said sub-cable wire assemblies from the sub-cable unit of the second cable-in-conduit superconductor unit to form a plurality of mated assemblies;
surrounding a portion of each mated assembly with an electrically conductive media;
enclosing each mated assembly in a sealed housing; and
providing a coolant to the sealed housing in order to maintain superconductivity in the first and second cable-in-conduit superconductor units.

16. A method as set forth in claim 15, wherein the surrounding a portion of each mated assembly comprises: providing a splicing collar with individual, electrically non-conductive splicing channels for each mated assembly formed therein; encapsulating a portion of each mated assembly in a solder material; placing at least the soldered portion of each mated assembly in a splicing channel; and securely fastening the splicing collar.

17. A method as set forth in claim 16, wherein the intertwining the sub-cable wire assemblies comprises: twisting under tension a length of a terminal end of an individual of said sub-cable wire assemblies from the sub-cable unit of the first cable-in-conduit superconductor unit with a corresponding length of a terminal end of one of said sub-cable wire assemblies from the sub-cable unit of the second cable-in-conduit superconductor unit to form a plurality of mated assemblies each having a defined length.

18. A method as set forth in claim 17, wherein providing the coolant comprises: providing said sealed housing to enclose all of the mated assemblies and providing a, flow of helium around the mated assemblies.

19. A method as set forth in claim 17, wherein the length of each mated assembly is between five and fifteen times a diameter of one of said sub-cable wire assemblies of the first cable-in-conduit superconductor unit and wherein the twisting under tension is performed at a twist pitch that is between five and fifteen times the diameter of one of the sub-cable wire assembly of the first cable-in-conduit superconductor unit.

20. A method as set forth in claim 16, wherein the splicing channels are formed to have a depth not greater than a diameter of the mated assembly.

21. A method as set forth in claim 15, wherein the dividing channels are formed to have a depth not greater than a diameter of one of the sub-cable units of the first cable-in-conduit superconductor unit.

22. A method for splicing a first cable-in-conduit superconductor unit to a second cable-in-conduit superconductor unit comprising:
providing first and second cable-in-conduit superconductor units, each unit having a plurality of sub-cable units wherein each sub-cable unit contains a plurality of sub-cable wire assemblies;
arranging the sub-cable units of the first cable-in-conduit superconductor unit in close proximity to corresponding said sub-cable units of the second cable-in-conduit superconductor unit;
intertwining an individual of said sub-cable wire assemblies from the sub-cable unit of the first cable-in-conduit superconductor unit with a corresponding one of said sub-cable wire assemblies from the sub-cable unit of the second cable-in-conduit superconductor unit to form a plurality of mated assemblies;
providing a splicing collar with individual, electrically non-conductive splicing channels for each mated assembly formed therein;
encapsulating a portion of mated assembly in a solder material; placing at least the soldered portion of each mated assembly in a splicing channel;
securely fastening the splicing collar;
enclosing each mated assembly in a sealed housing; and
providing a coolant to the sealed housing in order to maintain superconductivity in the first and second cable-in-conduit superconductor units.

23. A method as set forth in claim 22, wherein the splicing channels are formed to have a depth not greater than a diameter of the mated assembly.

24. A method for splicing a first cable-in-conduit superconductor unit to a second cable-in-conduit superconductor unit comprising:

providing first and second cable-in-conduit superconductor units, each unit having a plurality of sub-cable units wherein each sub-cable unit contains a plurality of sub-cable wire assemblies;

arranging the sub-cable units of the first cable-in-conduit superconductor unit in close proximity to corresponding sub-cable units of the second cable-in-conduit superconductor unit;

twisting under tension a length of a terminal end of an individual said sub-cable wire assemblies from the sub-cable unit of the first cable-in-conduit superconductor unit with a corresponding length of a terminal end of one of said sub-cable wire assemblies from the sub-cable unit of the second cable-in-conduit superconductor unit to form a plurality of mated assemblies each having a defined length;

surrounding a portion of each mated assembly with an electrically conductive media;

enclosing each mated assembly in a sealed housing; and providing a coolant to the sealed housing in order to maintain superconductivity in the first and second cable-in-conduit superconductor units.

25. A method as set forth in claim 24, wherein the length of each mated assembly is between five and fifteen times a diameter of one of the sub-cable wire assemblies of the first cable-in-conduit superconductor unit; and wherein the twisting under tension is performed at a twist pitch that is between five and fifteen times the diameter of one of the sub-cable wire assemblies of the first cable-in-conduit superconductor unit.

* * * * *